(12) United States Patent
Kholchanskiy et al.

(10) Patent No.: US 7,570,373 B2
(45) Date of Patent: Aug. 4, 2009

(54) SYSTEM AND METHOD TO MEASURE PARAMETERS DISTRIBUTION IN SHEET-LIKE OBJECTS

(75) Inventors: Sergey Kholchanskiy, St. Petersburg (RU); Victor Preobrazhenskiy, St. Petersburg (RU); Igor Zelenyak, St. Petersburg (RU); Victor Milovidov, St. Petersburg (RU); Nadejda Reingand, Baltimore, MD (US)

(73) Assignee: Prompribor, Inc., St. Petersburg (RU)

( * ) Notice: Subject to any disclaimer, the term of this patent is extended or adjusted under 35 U.S.C. 154(b) by 357 days.

(21) Appl. No.: 11/739,213

(22) Filed: Apr. 24, 2007

(65) Prior Publication Data

US 2007/0252592 A1 Nov. 1, 2007

Related U.S. Application Data

(60) Provisional application No. 60/795,751, filed on Apr. 29, 2006.

(51) Int. Cl.
*G01B 11/06* (2006.01)

(52) U.S. Cl. ..................................... 356/632; 356/630
(58) Field of Classification Search .......... 356/630–632
See application file for complete search history.

(56) References Cited

U.S. PATENT DOCUMENTS

| 5,499,098 | A  | * | 3/1996  | Ogawa ........................ 356/621 |
| 6,714,310 | B1 | * | 3/2004  | Tanaka et al. ............... 356/614 |
| 7,457,478 | B2 | * | 11/2008 | Aoyama et al. ............. 382/275 |

* cited by examiner

*Primary Examiner*—Michael P Stafira
(74) *Attorney, Agent, or Firm*—Nadejda Reingand (57) ABSTRACT

A measuring device and method are disclosed for parameter distribution measurement over the entire surface of sheet-like objects. The parameters of primary interest are thickness and permeability profiles. The device includes a parameter measuring unit a coordinate measuring unit and a synchronization unit to control operation of the parameter measuring unit and the coordinate measuring unit. The coordinate measuring unit determines the measuring device position on two-dimensional surface using image correlation analysis. The measuring device further comprises a platform for its movement in the plane of the sheet-like object.

20 Claims, 11 Drawing Sheets

SYSTEM AND METHOD TO MEASURE PARAMETERS DISTRIBUTION IN SHEET-LIKE OBJECTS

CROSS-REFERENCE TO RELATED APPLICATIONS

This application claims the benefit of Ser. No. 60/795,751 filed Apr. 29, 2006, which is fully incorporated herein by reference.

FIELD OF THE INVENTION

The present invention relates to a measuring system and method to determine parameters of a sheet-like object, especially a fabric (including forming fabric), press felt, cloth and paper. Said parameters include thickness and permeability profiles over the entire surface of the object.

BACKGROUND OF THE INVENTION

It is known that the quality of the finished paper product in paper manufacturing process depends to a large extent upon the press felt. Therefore it is very important for paper manufacturer to get knowledge about the press felt prevailing condition and properties, such as thickness, tension profile, permeability, etc. There is a need to provide reliable measuring devices and methods, which are capable of mapping those properties over the entire surface of the fabric. The width of the fabric, up to 10 meters and sometimes greater, makes it difficult to carry out these measurements.

Typically the thickness of the fabric is measured by a dial indicator; which allows measuring only a few points across the fabric. There are two main disadvantages of this method. Firstly, it is impossible to get an entire thickness profile of the fabric. And secondly, since the measurement is manual, it is difficult to obtain an exact coordinate across the width of the fabric for the point being measured. Due to these uncertainties, it is difficult to compare thickness results measurements performed at different time.

Current devices for thickness measurement to do not allow changing measurement trajectory, repeating measurements in some critical areas of an object, moving backwards, and in general choose a two-dimensional trajectory being optimal for a particular object under study. There is a need for a measurement device being able to move in any direction within the plane of the object.

The problems described above in conjunction with the measurement of the thickness profile also apply to the measurement of the tension profile, permeability and other parameters of the sheet-like objects. There is a need to repeatedly carry out measurements of these parameters over the entire surface of the fabric in a simple and reliable way.

SUMMARY OF THE INVENTION

The object of the present invention is to provide a measuring device, which is capable of measuring the parameters of a thin sheet object. The objects include fabric, cardboard, paper, press felt, cloth and plastic materials. The parameters of primary interest are the sheet-like object thickness profile and permeability over the entire surface of the object. The object may be up to 100 meter wide and up to 10 km long. In the preferred embodiment the object is 10 meter wide and 300 m long.

The measurement device of the present invention has a parameter measuring unit combined with a coordinate measuring unit. The units simultaneously measure the parameter and coordinate, respectively, at the particular point on the object surface being synchronized by a synchronization unit. The parameter measuring unit and the coordinate measuring unit move in the object surface plane in any direction periodically recording data for further digital signal processing. The coordinate measuring unit records images of a light spot around a point of measurement on the surface and store the images in a buffer. The light spot is created by illumination of the surface by a light source. A digital signal processing (DSP) unit is adapted to compare the images recorded sequentially when the coordinate measuring unit moves over the object surface. The images taken at sequential time moments are not the same, but they have at least 10% of image being taken from the same area of the surface. In other words, some parts of the sequential images are overlapping. The coordinate measurement is performed by correlation analysis of the sequential images.

In the preferred embodiment the parameter measuring unit performs the object thickness measuring using an inductive transducer. The thickness of the object is from 0.1 to 10 mm.

In another embodiment the parameter measuring unit performs the object permeability measurement.

In yet another embodiment the measuring device includes magnetic holders to attach the sheet-like object to the parameter measuring unit and the coordinate measuring unit.

In yet another embodiment the measuring device includes a moving platform for the parameter and coordinate measuring units motion over the object surface, which optionally may include a motor adapted for driving the units together along a preprogrammed trajectory in any direction within the object surface. The moving platform may have spherical elements as wheels.

In the preferred embodiment the parameter measuring unit, the coordinate measuring unit, the synchronization unit, and the moving platform form a first and a second block, the first block being positioned on a first side of the sheet-like object surface and the second block positioned on the second side of the sheet-like object surface, the second block being symmetrical to the first block relative to the sheet-like object.

A method to perform parameter distribution measurement for sheet-like materials is another object of the present invention. The method includes positioning at least a parameter measuring unit and a coordinate measuring unit on a sheet-like object surface at a point A, sending a first signal from a synchronization unit to initiate simultaneous operation of the parameter measuring unit and the coordinate measuring unit, recording a first measured parameter in a digital signal processing unit and a first image of a spot around a point A taken by a digital camera in a buffer, moving at least the parameter measuring unit and the coordinate measuring unit in any direction within the object surface on a step distance being less than a size of the spot in a direction of a displacement, sending a second signal from a synchronization unit to initiate simultaneous operation of the parameter measuring unit and the coordinate measuring unit, recording a second measured parameter in the digital signal processing unit and a second image of a spot around the point B in the buffer, sending the first and the second image from the buffer to the digital signal processing unit, determining a first coordinate, a second coordinates and a magnitude of the displacement and the direction of the displacement by comparing a microstructure in the first and the second images, displaying in graphics at least the first and the second parameters in association with the first and second coordinates.

The direction of the measuring device movement is not limited to the direction perpendicular to the edge of the measured surface, but it is chosen to optimize the measurement time and quality.

It is another object of the present invention to perform multiple measurements along two-dimensional trajectory over the object surface and to obtain the parameter distribution over entire surface.

BRIEF DESCRIPTION OF THE DRAWINGS

FIG. 9. Examples of programmed moving trajectories for the measuring device: (a) a zig-zag, (b) a grid, (c) a repetitive scanning of the critical area.

FIG. 10. Top (a) and side (b) views of one embodiment of the measuring device of the present invention.

FIG. 11. Experimental results: (a) a spatial distribution of the press felt thickness, (b) temporal change of the press felt thickness.

DETAILED DESCRIPTION OF THE PREFERRED EMBODIMENT

Figure 1:
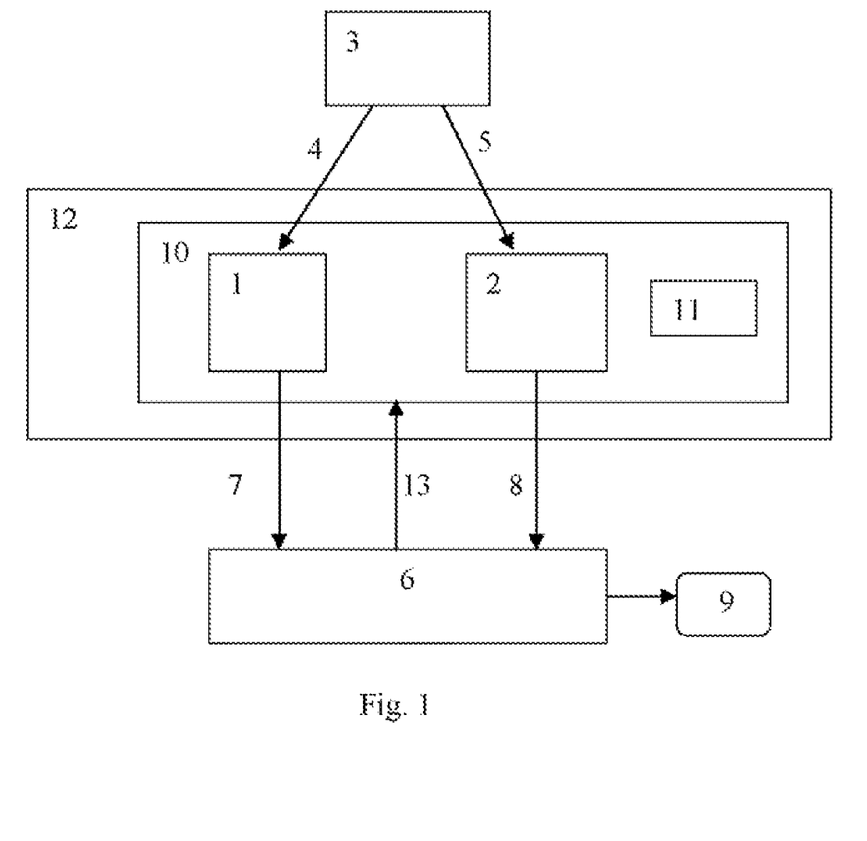
FIG. 1. A block diagram of the device to be used for measuring the parameters distribution in sheet-like objects.

A measuring device according to the present invention consists of following units with a connection between them as shown in FIG. 1. Unit 1 is a coordinate measuring unit based on correlation method. Unit 2 is a measuring device to determine particular parameter of the thin sheet object under study. In the preferred embodiment the parameter is the object's thickness. Unit 3 is a synchronization unit that ensures turning on Units 1 and 2 simultaneously by sending signals 4 and 5 to start measurement of coordinate (Unit 1) and object parameter (Unit 2) at the same moment. Data from Unit 1 and Unit 2 enters digital signal processing (DSP) Unit 6 through channels 7 and 8. Unit 6 is adapted to store and process the data from Units 1 and 2, recover displacement magnitude and parameter value, and then to display the data on a screen 9. At least Units 1 and 2 are positioned on a moving platform 10, which optionally has holder 11 to attach the device to the surface of the object 12. The platform 10 may optionally be controlled by the DSP Unit 6 via link 13 to control platform moving along predetermined trajectory.

Figure 2:
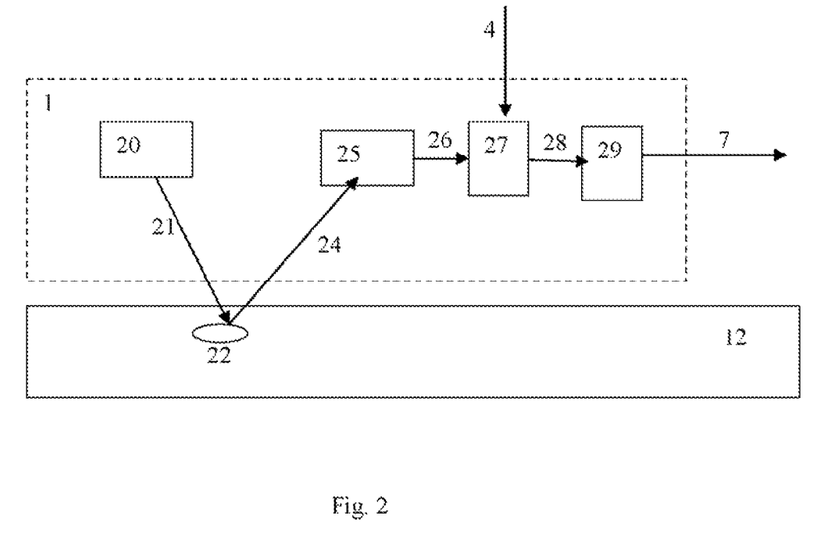
FIG. 2. A block diagram of the coordinate measuring unit.

Block diagram of Unit 1 for coordinate measurement is shown in FIG. 2. Light source 20 irradiates light beam 21 and illuminates a spot 22 on an object under study 12. Reflected light beam 24, is collected by optoelectronics imaging device 25. Imaging device 25 outputs electrical signal 26. Gate 27 lets the signal 26 through when the control signal 4 triggers it. Output signal 28 is stored in a buffer 29. The signal 7 outputs Unit 1 for further processing in the DSP Unit 6 as shown in FIG. 1.

Light emitting diodes are good candidates for light source 20. For example, RL5-W8045 White LED from Super Bright LEDs, Inc (St. Louis, Mo.) with 2500 mcd output luminous intensity and 45 Degree viewing angle can be used.

Figure 3:
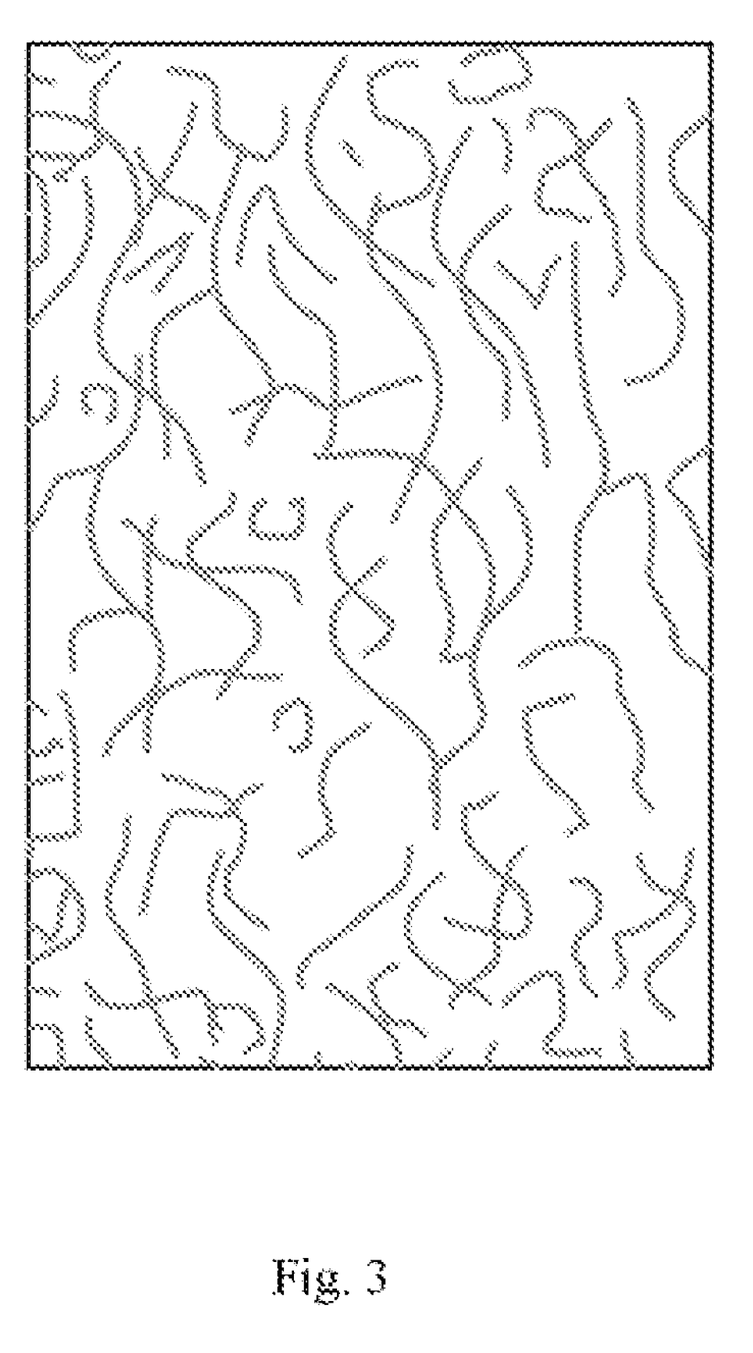
FIG. 3. A fabric with microstructure as an example of the object under study.

CCD camera such as MC-F433 Color 30 fps Firewire Camera from 1stVision, Inc. (Andover, Mass.) can be used as an imaging device 25. The imaging device may optionally include additional optical elements such as lenses, filters, pinholes or other element to improve the quality of image captured by CCD matrix. Camera parameter must allow resolving micro features of image of about 0.1 to 1 mm as shown in FIG. 3. A fabric is used as an example of the object in FIG. 3.

Unit 1 measures coordinate in the manner similar to known displacement measurement using correlation method, see, for example, Feiel et al. "High resolution laser speckle correlation for displacement and strain measurement", incorporated herein by reference. Speckle structure serves as micro features in the system disclosed in the above-mentioned article. Any other types of micro features as long as they have irregular structure can be used for image processing in correlation method.

Figure 4:
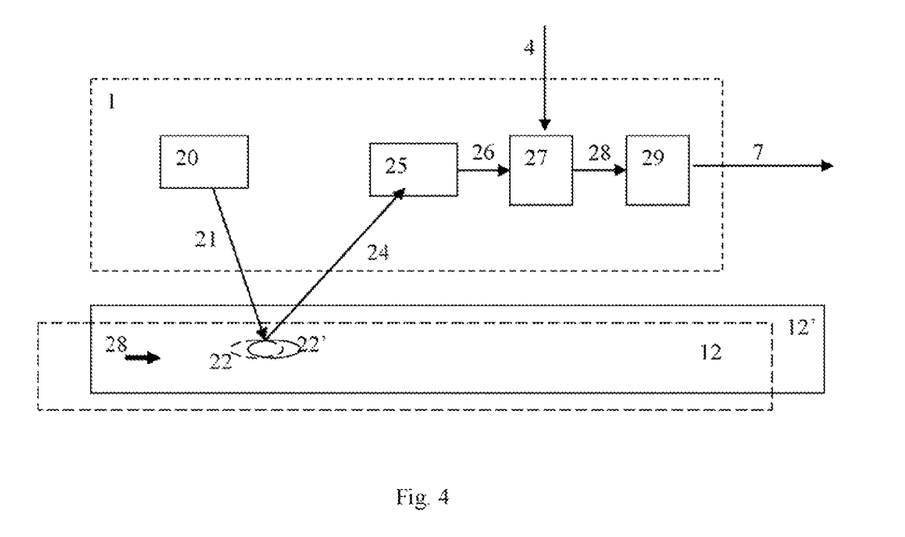
FIG. 4. An illustration of the coordinate measuring unit operation.
Figure 5:
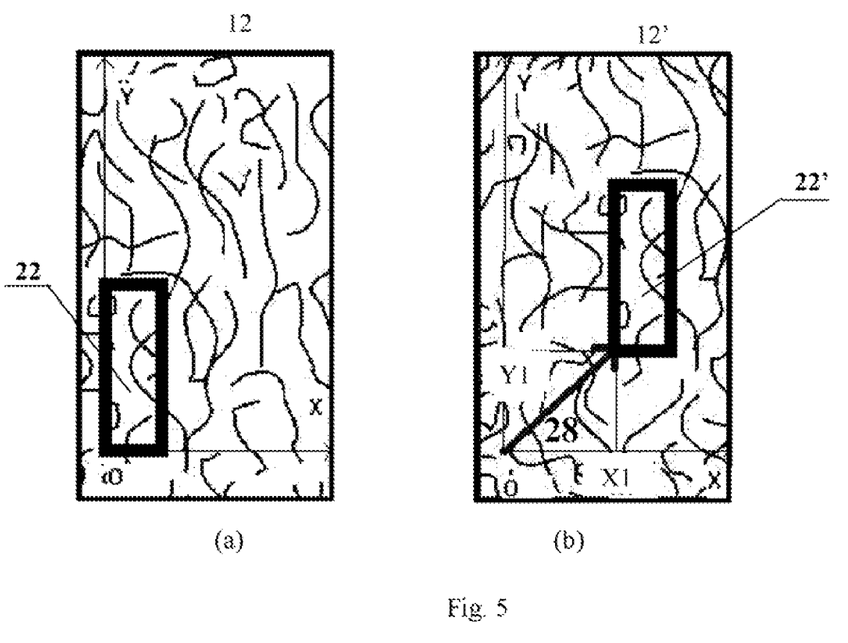
FIG. 5. Images of the object under study before and after the object displacement.

FIG. 4 helps to explain how Unit 1 operates. An image of the particular spot 22 is captured by the imaging device 25 and outputs through gate 27 to be stored in the buffer 29. It serves as an initial point of measurement, a zero-coordinate. Further measured coordinates are related to this initial position of the coordinate measuring Unit 1. Then the object displacement takes place, which may happen in arbitrary direction in the plane of the object. It is indicated by a vector 28 in FIG. 4. A new image of a new spot 22' is captured that includes a part of image 22. In other words images 22 and 22' correspond to the parts of the surface under study that are partially overlap. The new image 22' outputs through gate 27 to be stored in the buffer 29 and further processed in the DSP Unit 6 (not shown in FIG. 4). The magnitude of the displacement 28 is always smaller that the size of the image 22 in the direction of the displacement. This ensures images overlapping. Images 22 and 22' are shown in FIG. 5 where the vector 28 indicates the direction and a magnitude of the displacement. Framed areas 22 and 22' in FIGS. 5 (a) and 5 (b) have the same microstructure. The processing Unit 6 performs coordinate calculation based on image correlation analysis.

Alternatively the whole system for thin sheet object parameters measurement, which includes Unit 1 can be displaced relative to an unmoving object.

Figure 6:
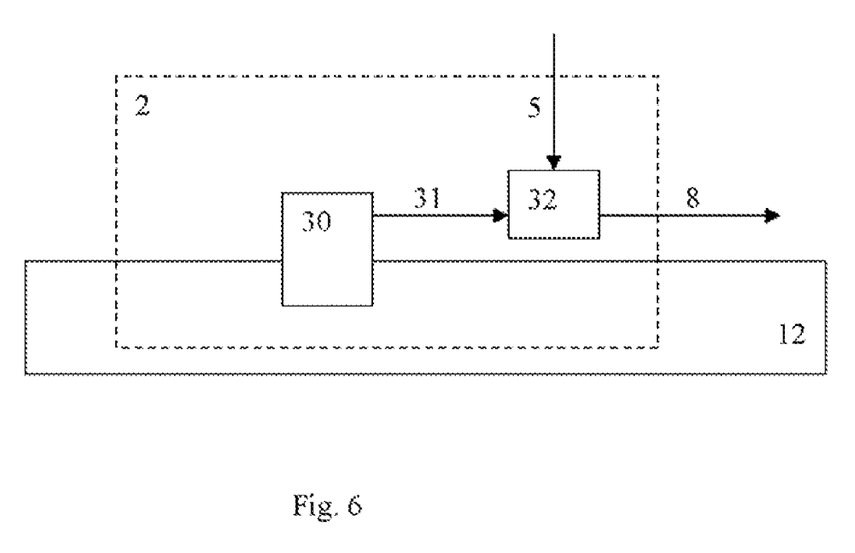
FIG. 6. A block diagram of the thickness measuring unit.

Unit 2 is an object parameter measuring unit. It can be a device for measuring sheet-like material thickness as shown in FIG. 6, but not limited to this example. The examples of thin object measurement device may include ones based on local resistance measurement, contact profilometers, non-contact optical devices and others.

Thickness measuring unit shown in FIG. 6 comprises essentially of a gauge 30 and a gate 32. The gauge 30 performs the thickness measurement of the object 12 by known inductive method, see for example U.S. Pat. No. 4,695,797 by Deutsch et al., incorporated herein by reference. In the preferred embodiment the range of the object thickness is from 0.1 mm to 10 mm. The gauge 30 outputs signal 31. Gate 32 lets the signal 31 through when the control signal 5 triggers it. Thus the signal 8 outputs Unit 2 at the particular moment determined by the signal 5 coming from synchronization Unit 3 as shown in FIG. 1. The moment of the parameter measurement coincides with the moment of coordinate measurement by Unit 1.

The holder 11 in FIG. 1 serves to ensure contact of the object under study 12 and the gauge 30, being a part of Unit 1. The holder 11 can be a known magnetic holder. Alternatively the holder 11 can be a known low-pressure holder that attaches sheet material to the measuring device by creating a pressure below atmospheric pressure.

The disclosed measuring device includes Units 1, 2, 3, and 6 as mentioned in the description above. Either the object under study or the measuring device moves relatively each other during the measurement procedure. It should be pointed out that the measuring device can be split into two parts, one of which is a moving part and another is a stationary one. Units 1 and 2 must be in the moving part, however Units 3 and 6 may be included both or separately in the moving part or may be stationary part connected to the moving part by flexible links. Alternatively, synchronization Unit 3 and DSP Unit 6 may be connected with Units 1 and 2 by means of wireless connection.

Figure 7:
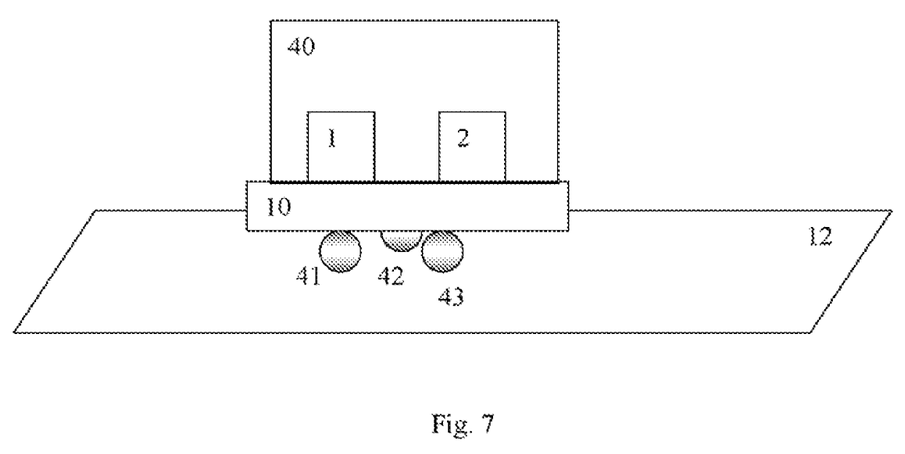
FIG. 7. An illustration of the measuring device movement over the object surface.

FIG. 7 illustrates the movement of measuring device 40 relatively the object under study on the moving platform 10. The movement of the measuring device that includes at least Units 1 and 2 (and optionally Units 3 and 6) relative to the sheet-like object 12 is a two-dimensional movement in the plane of the object 12. The present invention proposes application of spheres 41, 42, 43 to perform this type of movement as shown in FIG. 7. Similar moving platform is disclosed in U.S. Pat. No. 6,128,853 by Klonel et al., incorporated herein by reference. The number of spheres can be larger or less than three shown in FIG. 7. Application of spheres provides an example of two-dimensional movement platform in the plane of the object under study; however the invention is not limited to this example.

Figure 8:
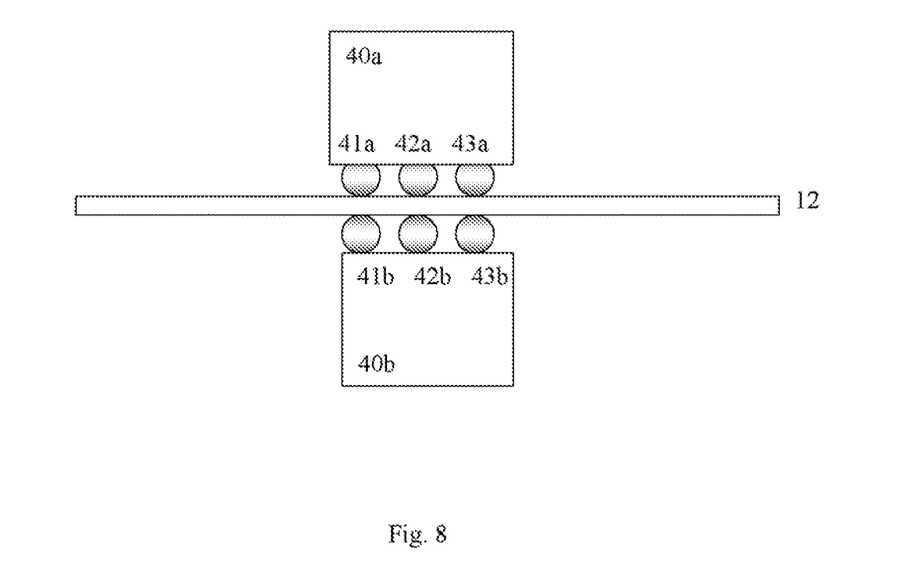
FIG. 8. An example of the measuring device consisted of two blocks.

The measuring device of the present invention may consist of two blocks, one of which (40*a*) is located to the top of the sheet object 12 and the second block (40*b*) is attached to the bottom of the object 12 as shown in FIG. 8. This configuration is typical, for example, for inductive transducers for thickness measurement devices. If the object is vertical, then the blocks 40*a* and 40*b* will be on the right and on the left side of the object respectively.

Both blocks 40*a* and 40*b* are moving relative to the object 13 using, for example, sets of spheres 41*a*, 42*a*, 43*a* and 41*b*, 42*b*, 43*b*. The amount of spheres can be larger or less than six shown in FIG. 8, they maybe positioned on both upper and lower blocks or simply on one of the blocks. In the preferred embodiment the Parts 40*a* and 40*b* are coupled by magnetic holders.

In one embodiment of the present invention the moving platform can be preprogrammed for autonomic omni-directional movement in the plane of the object. An example of such robotic platform is disclosed in U.S. Pat. No. 5,374,879 by Pin et al., incorporated herein by reference.

Figure 9:
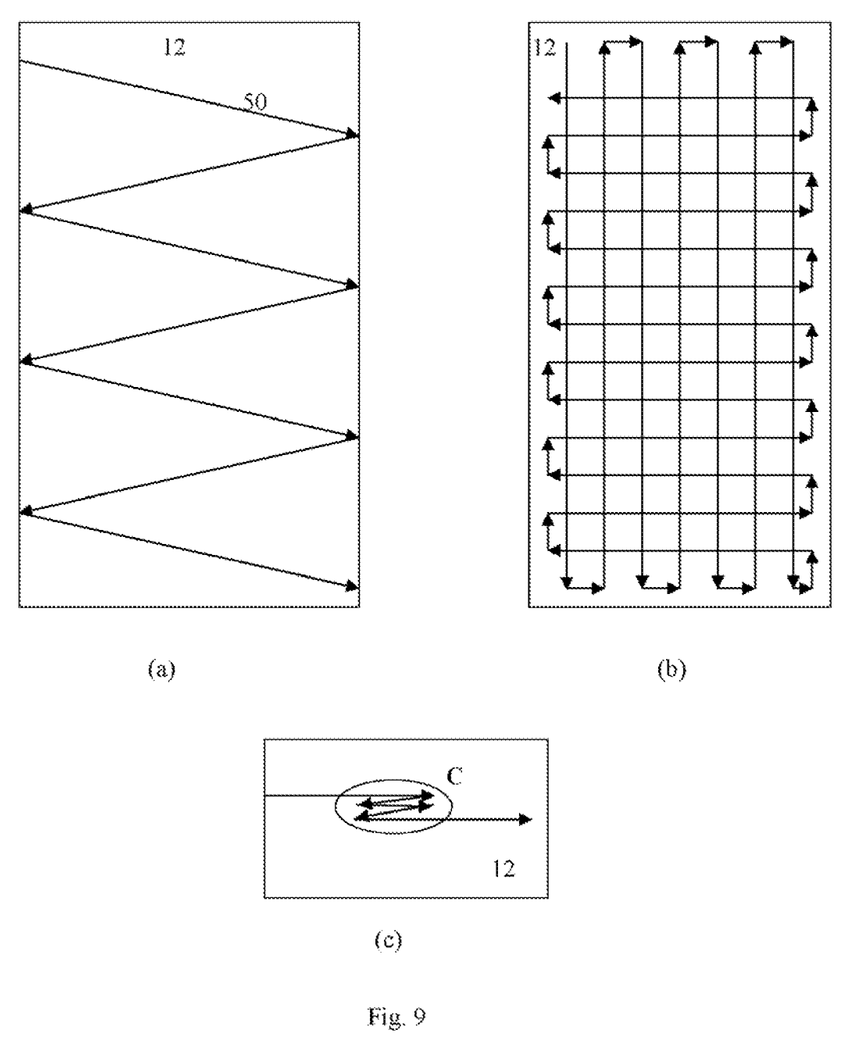

Two-dimensional moving platform can be pre-programmed by the DSP Unit 6 to perform the movement along trajectory, which is optimal for performing measurements for a particular type of object under study. Signal 13 from the DSP Unit 6 that controls motion of the platform 10 is shown in FIG. 1. As an example, the moving platform can be programmed to move forming a diagonal path 50 on the surface of the object 12 as shown in FIG. 9(*a*). The optimization of the measurement time can be achieved for example by such diagonal movement of the measuring device on the measured surface. Another example is associated with moving objects such as a fabric or paper sheet moving on a production conveyor. The speed of the conveyor movement and an angle of the measuring device movement can be synchronized in the manner providing the optimal performance of the object measurement, such as a thickness of the fabric.

Another example is shown in FIG. 9(*b*). The measurement is performed in along X and Y directions with a distance between consecutive parallel paths according to required measurement resolution. Another example shown in FIG. 9(*c*) demonstrates multiple paths of the measuring unit in some critical area C of the object surface. The system allows repeated measurement of the critical spots on the measured surface to ensure the best accuracy. These repeated measuring of particular spot parameters does not require return of the measuring device to the initial position near the edge of the measured surface.

Possible trajectories are not limited to above mentioned examples. These examples illustrate advantages of omni-directional moving platform compared to one-dimensional moving disclosed in prior art.

The disclosed device and method is not limited to objects having straight edges, but can be implemented to any kind of thin sheet objects.

The measuring unit is not limited to the thickness measuring device. It may be, for example, a permeability measuring unit for a sheet-like material. U.S. Pat. No. 6,971,261 by Ischdonat et al. discloses a fabric permeability device for paper production line. The device comprises a nozzle aimed at a surface of the moving clothing, the nozzle producing a water flow, which is measured at the opposite side of the clothing. The clothing permeability is determined on the basis of the measured flow.

Another example of measuring unit is an apparatus for detection of holes and plugged spots on a fast running fabric such as described in U.S. Pat. No. 5,725,737 by Pikulik et al.

EXPERIMENTAL RESULTS

Figure 10:
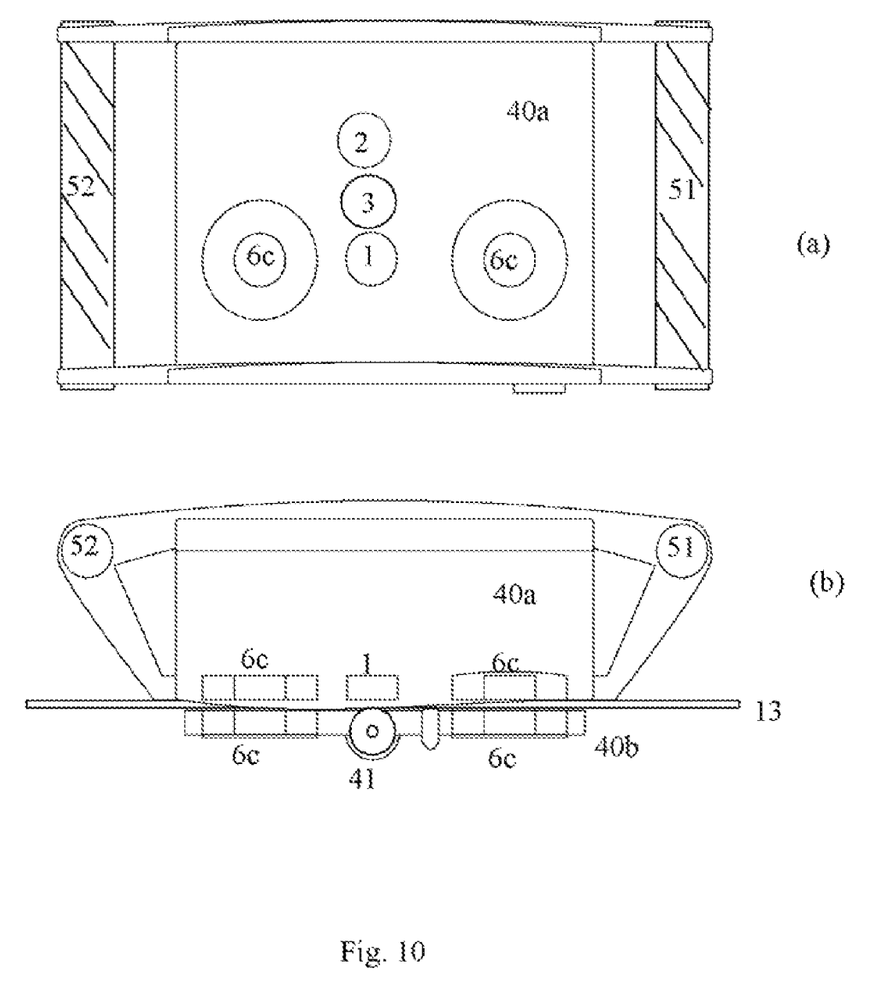

FIGS. 10 (*a*) and (*b*) show top and side view of one embodiment of the device of the present invention. It consists of two blocks 40*a* and 40*b* attached to the opposite sides of the object 12. The device performs thickness measurement using inductive method. The parameter measuring Unit 2, the coordinate Unit 1 and synchronization Unit 3 are located in the center of the device. Both blocks 40*a* and 40*b* have magnetic holders 6*c* and manually moved along the selected trajectory using the wheel 41. Two handles 51 and 52 are attached on both sides of the device to facilitate the device moving. The speed of movements was about 10 cm per second during the experiment.

Figure 11:
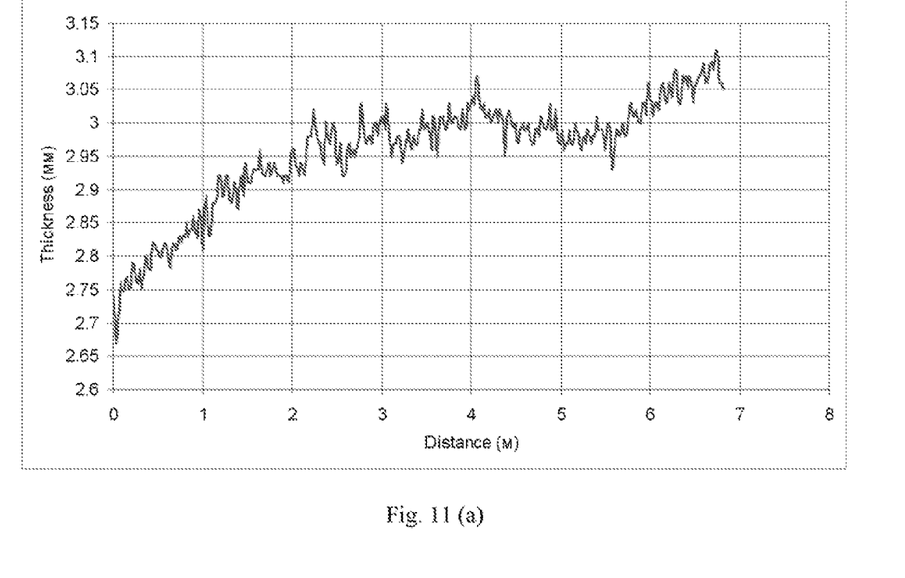

FIG. 11(*a*) depicts the results of thickness measurement of the press felt in paper production plant. The fabric is about 10% thicker on one side than another, which typically happens when pressure on press rollers is not uniform. An adjustment of the roller pressure can be recommended as a result of the measurement. The adjustment can prevent the fabric damage and also improves the quality of produced paper.

FIG. 11 (*b*) shows results of the thickness measurement for the same press felt after 23 days (upper line) and after 30 days (lower line) of exploitation. Almost even wear of about 0.5 mm per week is observed along all 8 meters of the fabric width.

The foregoing description of the preferred embodiment of the invention has been presented for purposes of illustration and description. It is not intended to be exhaustive or to limit the invention to the precise forms disclosed. Obviously, many modifications and variations will be apparent to practitioners skilled in the art. It is intended that the scope of the invention be defined by the following claims and their equivalents.

What is claimed is:

1. A measuring device for measuring a spatial distribution of at least one parameter of a sheet-like object, comprising:
   a parameter measuring unit for measuring a parameter at least at a point A and a point B on an object surface,
   a coordinate measuring unit for measuring a coordinate at least at the point B relative to the point A on the object surface, the coordinate measuring unit being connected to a digital signal processing unit, the coordinate measuring, unit performing the coordinate measuring by determining a correlation between a first image of a spot around the point A at a time $T_1$ and a second image of a spot around the point B at a time $T_2$, the first and the second images being taken by a digital camera, a synchronization unit connected to the parameter measurement unit and to the coordinate measuring unit, the synchronization unit adapted to turn on the coordinate measuring unit simultaneously with the parameter measuring unit;

moving platform to perform a displacement of at least the parameter measuring unit and the coordinate measuring unit together in any direction within the object surface, wherein the displacement consists of steps, a length of each step being smaller than a length of the spot around the point A in a direction of the displacement.

2. The measuring device according to claim 1, further comprising magnetic holders to attach the sheet-like object to the parameter measuring unit and the coordinate measuring unit.

3. The measuring device according to claim 1, wherein the parameter is a thickness of the sheet-like object.

4. The measuring device according to claim 3, wherein the parameter measuring unit is an inductive transducer for measuring the thickness of the sheet-like object.

5. The measuring device according to claim 3, wherein the thickness of the object is from 0.1 mm to 10 mm.

6. The measuring device according to claim 1, wherein the parameter measuring unit is a permeability transducer for measuring a permeability of the sheet-like object.

7. The measuring device according to claim 1, wherein the moving platform comprises at least one spherical rotating element.

8. The measuring device according to claim 1, wherein the moving platform further comprises a motor adapted for driving at least the parameter measuring unit and the coordinate measuring unit together along a preprogrammed trajectory in any direction within the object surface.

9. The measuring device according to claim 8, wherein the programmed trajectory is chosen to provide complete information bout the object parameter distribution cover the object surface in a shortest time.

10. The measuring device according to claim 1, wherein the object is a fabric, a paper, a plastic sheet, a foil, a metal sheet or a felt.

11. The measuring device according to claim 1, wherein the object surface is at least 10 meters long in the direction of the measuring.

12. The measuring device according to claim 1, wherein the coordinate measuring unit further comprises
a light source for illuminating the spot around the measuring point A and the spot around the measuring point B,
a storage buffer to store at least the first image of the spot around the point A taken at the time $T_1$ and the second image of the spot around the point B taken at the time $T_2$.

13. The measuring device according to claim 1, wherein the parameter measuring unit the coordinate measuring unit, the synchronization unit and the moving platform form a first and a second block, the first block being positioned on a first side of the sheet-like object surface and the second block positioned on a second side of the sheet-like object surface the second block being positioned symmetrical to the first block relative to the sheet-like object.

14. The measuring device according to claim 1, wherein the digital signal processing unit is located on distance R from the sheet-like object, where R is from 10 cm to 100 meters.

15. A method of measuring a distribution of at least one parameter of a sheet-like object, comprising:
positioning at least a parameter measuring unit and a coordinate measuring unit on a sheet-like object surface at a point A,
sending a first signal from a synchronization unit to initiate simultaneous operation of the parameter measuring unit and the coordinate measuring unit,
recording a first measured parameter in a digital signal processing unit and a first image of a spot around the point A taken by a digital camera in a buffer of the coordinate measuring unit,
moving at least the parameter measuring, unit and the coordinate measuring unit in any direction within the object surface on a step distance being less than a size of the spot in a direction of a displacement,
sending a second signal from a synchronization unit to initiate simultaneous operation of the parameter measuring unit and the coordinate measuring unit,
recording a second measured parameter in the digital signal processing unit and a second image of a spot around the point B in the buffer,
sending the first and the second images from the buffer to a digital signal processing unit,
determining a first coordinate, a second coordinates and a magnitude of the displacement and the direction of the displacement by comparing a microstructure in the first and the second images,
displaying in graphics at least the first and the second parameters in association with the first and the second coordinates.

16. The method of claim 15, wherein the microstructure comparing includes correlation analysis.

17. The method of claim 15, wherein the first and the second parameter are the sheet-like object thickness in the points A and B respectively.

18. The method of claim 15, wherein the first and the second parameters are the sheet-like object permeability, in the points A and B respectively.

19. The method of claim 15, wherein the coordinate measuring unit further comprises
a light source for illuminating at least the spot around a point A at a time $T_1$, and the spot around a point B at a time $T_2$,
a digital camera for capturing the images of the spot around the point A and around the point B,
a buffer to store at least the first image of the spot around the point A taken at the time $T_1$ and the second image of the spot around the point B taken at the time $T_2$.

20. The method of claim 15, further comprising
moving at least the parameter measuring unit and the coordinate measuring unit in any direction within the object surface on an entire measurement distance, wherein the entire measurement distance is divided into a number of the step distances,
measuring a parameter and a coordinate at each point at the step distances along the moving trajectory,
displaying the spatial distribution of the parameter in graphics.

* * * * *